United States Patent [19]
Martine et al.

[11] Patent Number: 5,883,023
[45] Date of Patent: Mar. 16, 1999

[54] GLASS MONOFILAMENT AND STRAND MATS, THERMOPLASTIC COMPOSITES REINFORCED WITH THE SAME AND METHODS FOR MAKING THE SAME

[75] Inventors: Edward A. Martine; Jian Meng, both of Pittsburgh; Thomas V. Thimons, Allison Park; Thomas P. Unites, Library, all of Pa.

[73] Assignee: PPG Industries, Inc., Pittsburgh, Pa.

[21] Appl. No.: 828,212

[22] Filed: Mar. 21, 1997

[51] Int. Cl.$^6$ .................................................. B04D 1/00
[52] U.S. Cl. ........................... 442/331; 442/60; 442/61; 442/276; 442/334; 442/381; 156/180; 156/326; 156/327
[58] Field of Search ............... 442/60, 61, 276, 442/331, 334, 381; 156/180, 326, 327

[56] References Cited

U.S. PATENT DOCUMENTS

| | | | |
|---|---|---|---|
| 3,544,414 | 12/1970 | Simison | 156/369 |
| 3,614,936 | 10/1971 | Philipps | 112/420 |
| 3,664,909 | 5/1972 | Ackley | 161/141 |
| 3,713,962 | 1/1973 | Ackley | 161/154 |
| 3,772,739 | 11/1973 | Lovgren | |
| 3,850,723 | 11/1974 | Ackley | 156/180 |
| 3,889,035 | 6/1975 | Jakes | 428/227 |
| 4,112,174 | 9/1978 | Hannes et al. | 428/220 |
| 4,129,674 | 12/1978 | Hannes et al. | 428/285 |
| 4,277,531 | 7/1981 | Picone | 428/228 |
| 4,390,336 | 6/1983 | Ziegler | 425/82 |
| 4,466,819 | 8/1984 | Dunn | 65/463 |
| 4,547,421 | 10/1985 | Dunbar | 428/285 |

(List continued on next page.)

FOREIGN PATENT DOCUMENTS

| | | |
|---|---|---|
| 329255 | 5/1994 | European Pat. Off. . |
| 0745716 | 12/1996 | European Pat. Off. . |
| 3321006 | 4/1987 | Germany . |
| 60208243 | of 0000 | Japan . |
| 95075846 | 4/1987 | Japan . |
| 6248550 | 9/1994 | Japan . |
| 816305 | 2/1996 | Japan . |
| 666591 | 2/1952 | United Kingdom . |
| 2104559 | 3/1983 | United Kingdom . |
| 1443754 | 4/1987 | United Kingdom . |
| 2180562 | 4/1987 | United Kingdom . |
| WO 92/04491 | 3/1992 | WIPO . |

OTHER PUBLICATIONS

"From Bale to Nonwoven Web in One Continuous Operation," a publication of Rando Machine Corp., (Sep. 1990) at pp. 4–5.

Rando–Web Process, a publication of Rando Machine Corporation.

Research Disclosure 38713, "Waste Fiber Glass Mat", Jul. 1996, p. 409.

"Waste Fiber Glass Mat", Research Disclosure (Jul. 1996) at p. 409.

U.S. Patent Application No. 08/787,735.

K. Loewenstein, The Manufacturing Technology of Glass ibres, (3d Ed. 1993) at pp. 22–27, 30–44, 47–60, 115–122, 119–151, 126–135, 165–173, 219–222, 237–291, 315.

Encyclopedia of Polymer Science and Technology, vol. 6 (1967) at pp. 505–712.

"From Bale to Nonwoven Web in One Continuous Operation", a publication of Rando, Inc. (Sep. 1990) at pp. 4–5.

*Primary Examiner*—Richard Weisberger
*Attorney, Agent, or Firm*—Ann Marie Cannoni

[57] ABSTRACT

A needled mat adapted to reinforce a thermoplastic matrix material to form a composite, the mat including: (a) a plurality of discontinuous glass monofilaments present in an amount ranging from at least about 30 weight percent to about 99 weight percent of the mat on a total solids basis and having a filament coating composition thereon which is compatible with a thermoplastic matrix material; and (b) a plurality of discontinuous glass fiber strands and having a strand coating composition thereon which is compatible with the thermoplastic matrix material, wherein the glass monofilaments and glass fiber strands are essentially uniformly distributed throughout the mat.

19 Claims, 4 Drawing Sheets

U.S. PATENT DOCUMENTS

| | | | |
|---|---|---|---|
| 4,600,423 | 7/1986 | Stotler et al. | 65/458 |
| 4,601,741 | 7/1986 | Stotler et al. | 65/458 |
| 4,640,810 | 2/1987 | Laursen et al. | 264/518 |
| 4,749,613 | 6/1988 | Yamada et al. | 428/286 |
| 4,847,140 | 7/1989 | Jaskowski | 428/220 |
| 4,886,701 | 12/1989 | Ehnert et al. | 428/282 |
| 4,921,659 | 5/1990 | Marshall et al. | 264/510 |
| 4,931,357 | 6/1990 | Marshall et al. | 428/284 |
| 4,931,358 | 6/1990 | Wahl et al. | 428/285 |
| 4,948,661 | 8/1990 | Smith et al. | 428/286 |
| 4,952,128 | 8/1990 | Marshall et al. | 425/82 |
| 5,011,737 | 4/1991 | Smith et al. | 428/409 |
| 5,014,396 | 5/1991 | Nieminen | 19/205 |
| 5,071,608 | 12/1991 | Smith et al. | 264/119 |
| 5,098,624 | 3/1992 | Smith et al. | 264/119 |
| 5,108,678 | 4/1992 | Hirasaka et al. | 264/113 |
| 5,129,131 | 7/1992 | Kimura et al. | 28/107 |
| 5,194,462 | 3/1993 | Hirasaka et al. | 524/13 |
| 5,380,580 | 1/1995 | Rogers et al. | 428/219 |
| 5,437,928 | 8/1995 | Thimons et al. | 428/391 |
| 5,441,590 | 8/1995 | Ihm et al. | 156/148 |
| 5,540,986 | 7/1996 | Kimura et al. | 428/285 |
| 5,565,049 | 10/1996 | Simmons et al. | 156/62.6 |
| 5,571,610 | 11/1996 | Loftus et al. | 428/285 |
| 5,580,646 | 12/1996 | Jansz et al. | 428/228 |

GLASS MONOFILAMENT AND STRAND MATS, THERMOPLASTIC COMPOSITES REINFORCED WITH THE SAME AND METHODS FOR MAKING THE SAME

FIELD OF THE INVENTION

This invention relates generally to glass fiber mats, thermoplastic composites reinforced with the same and methods for making the same. More particularly, this invention relates to needled mats of generally uniformly dispersed glass monofilaments and strands, thermoplastic composites reinforced with the same and methods for making the same.

BACKGROUND OF THE INVENTION

An increasingly popular process for forming composites is by compression molding or stamping a moldable sheet of a thermoplastic resin reinforced with fibers such as a glass fiber mat, often referred to as glass mat thermoplastics or "GMT". These composite sheets can be used to form articles such as automobile components and housings for computers.

An example of a commercially successful GMT sheet is the AZDEL® moldable composite sheet which is formed by extruding layers of polypropylene resin sheet with needled mats of continuous glass fiber strand. The AZDEL® composite sheet is commercially available from Azdel, Inc. of Shelby, N.C.

For reinforcing a resin matrix material, U.S. Pat. Nos. 3,664,909, 3,713,962 and 3,850,723 disclose fibrous mats of unstranded filaments which can be layered with reinforcing mats of fiber strands.

U.S. Pat. Nos. 4,948,661, 5,011,737, 5,071,608 and 5,098,624 disclose fiber reinforced thermoplastic molded products produced by intimately blending reinforcing glass fibers and thermoplastic fibers into a web and heating the web to the melting point of the thermoplastic fibers while applying pressure to the web to press the web into a consolidated structure.

U.S. Pat. No. 4,112,174 and 4,129,674 disclose a carrier mat useful in the manufacture of roofing materials which includes a web of randomly dispersed monofilament glass fibers, elongated glass fiber bundles and a binder such as urea-formaldehyde for consolidating the mat.

U.S. Pat. Nos. 5,108,678 and 5,194,462 disclose a fiber reinforced plastic sheet having a gradient layer structure wherein less opened strands are concentrated in the lower layers and more opened strands are concentrated in the upper layers of the structure.

There is a long-felt need in the industry for a mat for applications such as GMT which can be readily impregnated by the thermoplastic matrix material, which has good uniformity of glass distribution and flow into complex mold shapes and which provides a composite having good surface smoothness and mechanical properties, such as strength and stiffness.

SUMMARY OF THE INVENTION

One aspect of the present invention is a mat adapted to reinforce a thermoplastic matrix material, the mat comprising: (a) a plurality of glass monofilaments present in an amount ranging from at least about 30 weight percent to about 99 weight percent of the mat on a total solids basis, the plurality of glass monofilaments having a mean average length ranging from about 5 to about 150 millimeters and having a filament coating composition which is compatible with a thermoplastic matrix material applied to at least a portion of surfaces of the glass monofilaments; and (b) a plurality of glass fiber strands, each glass fiber strand having at least about 100 generally parallel glass fiber monofilaments, the plurality of glass fiber strands having a mean average length ranging from about 5 to about 150 millimeters and having a strand coating composition which is compatible with the thermoplastic matrix material applied to at least a portion of surfaces of the glass fiber strands; wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands by needing the portions together.

Another aspect of the present invention is a reinforced polymeric composite comprising: (a) a thermoplastic matrix material; and (b) a reinforcing mat comprising: (1) a plurality of glass monofilaments present in an amount ranging from at least about 30 weight percent to about 99 weight percent of the mat on a total solids basis, the plurality of glass monofilaments having a mean average length ranging from about 5 to about 150 millimeters and having a filament coating composition which is compatible with the thermoplastic matrix material applied to at least a portion of surfaces of the glass monofilaments; and (2) a plurality of glass fiber strands comprising at least about 100 glass fiber monofilaments per strand, the glass fiber strands having a mean average length ranging from about 5 to about 150 millimeters and having a strand coating composition which is compatible with the thermoplastic matrix material applied to at least a portion of surfaces of the glass fiber strands; wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands by needing the portions together.

Another aspect of the present invention is a method for making a mat adapted to reinforce a thermoplastic matrix material, the method comprising the steps of: (a) mixing a plurality of glass monofilaments with a plurality of glass fiber strands to form an essentially uniform mixture, the glass monofilaments comprising about 30 to about 99 weight percent of the mixture on a total solids basis, the glass monofilaments having a mean average length ranging from about 5 to about 150 millimeters and having a filament coating composition which is compatible with a thermoplastic matrix material applied to at least a portion of surfaces of the glass monofilaments, each glass fiber strand having at least about 100 generally parallel glass fiber monofilaments, the plurality of glass fiber strands having a mean average length ranging from about 5 to about 150 millimeters and having a strand coating composition which is compatible with the thermoplastic matrix material applied to at least a portion of surfaces of the glass fiber strands; (b) dispensing the mixture onto a collector to form a mat having a mat surface weight greater than about 200 grams per square meter; and (c) entangling the glass monofilaments with the glass fiber strands of the mat by needling the monofilaments and glass fiber strands together.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

The mat of the present invention provides numerous advantages in composite forming processes such as GMT, including but not limited to good permeability for impregnation by thermoplastic matrix material, good uniformity of glass distribution and flow into complex mold shapes and provides composites having good surface smoothness and mechanical properties, such as tensile, flexural and compressive strength, tensile and flexural modulus and stiffness.

Figure 1:
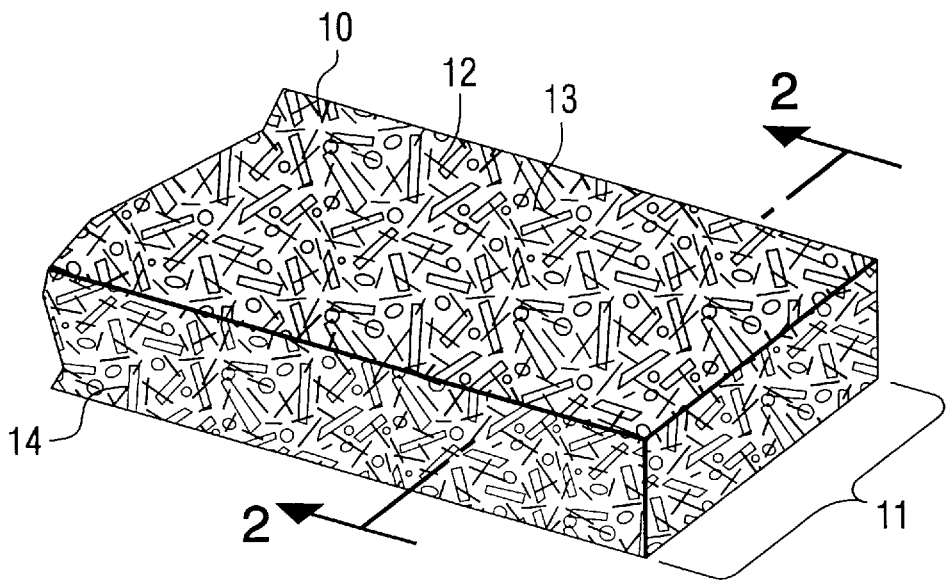
FIG. 1 is an enlarged schematic perspective view of a portion of a mat according to the present invention.
Figure 2:
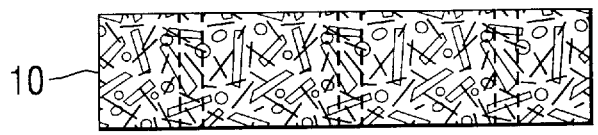
FIG. 2 is a cross sectional view of the mat of FIG. 1, taken along lines 2—2 of FIG. 1.

Referring to the drawings, wherein like numerals indicate like elements throughout, there is shown in FIGS. 1 and 2 a preferred embodiment of a mat, generally designated 10, in accordance with the present invention.

As shown in FIGS. 1 and 2, the mat 10 comprises a plurality of generally uniformly distributed, randomly oriented glass monofilaments 12 and glass fiber strands 14. As used herein, the term "monofilaments" means a plurality of individual filaments or fibers. The term "strand" as used herein refers to a plurality of filaments or fibers which are present in generally parallel cohesive bundles which resist separation of the adjacent filaments of the respective bundle. Each glass fiber strand 14 preferably comprises at least about 100 generally parallel glass filaments and more preferably about 200 to about 800 filaments.

As used herein, the phrase "randomly oriented" means that the glass monofilaments 12 and strands 14 (discussed below) of the mat 10 are randomly oriented in three dimensions, as shown in FIG. 1. Apparatus and methods for forming the mat 10 will be discussed in detail below.

The glass monofilaments 12 and glass fiber strands 14 are formed from glass filaments, a class of filaments generally accepted to be based upon oxide compositions such as silicates selectively modified with other oxide and non-oxide compositions. Useful glass filaments can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass filaments are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Continuous Glass Fibres,* (3d Ed. 1993), at pages 30–44, 47–60, 115–122 and 126–135, which are hereby incorporated by reference.

The glass filaments can have a nominal filament diameter ranging from about 5.0 to about 24.0 micrometers (corresponding to a filament designation of D through U), and preferably have a nominal filament diameter ranging from about 13.0 to about 23.0 micrometers (K through T). For further information regarding nominal filament diameters and designations of glass filaments, see Loewenstein at page 25, which is hereby incorporated by reference.

The phrase "discontinuous" means that the plurality of glass monofilaments 12 have mean average length ranging from about 5 to about 150 millimeters, preferably about 10 to about 75 millimeters, and more preferably about 25 to about 50 millimeters and that the plurality of glass fiber strands 14 have a mean average length ranging from about 5 to about 150 millimeters, preferably about 10 to about 75 millimeters, and more preferably about 25 to about 50 millimeters.

The glass monofilaments 12 are present in an amount ranging from at least about 30 weight percent to about 99 weight percent of the mat on a total solids basis. Preferably, the glass monofilaments 12 are present in an amount ranging from about 40 weight percent to about 90 weight percent and, more preferably, about 50 weight percent to about 70 weight percent of the mat on a total solids basis. The glass fiber strands 14 are present in a amount ranging from about 1 to about 70 weight percent of the mat on a total solids basis, preferably about 10 to about 60 weight percent and more preferably about 30 to about 50 weight percent.

The glass monofilaments 12 have a filament coating composition which is compatible with the thermoplastic matrix material 16 applied to at least a portion of surfaces of the glass monofilaments 12, preferably as an essentially dried residue. The glass fiber strands 14 have a strand coating composition which is compatible with the thermoplastic matrix material 16 applied to at least a portion of surfaces of the glass fiber strands, preferably as an essentially dried residue.

The filament coating composition preferably has the same components and/or amounts of components as the strand coating composition. Alternatively, the components and/or amounts of components of the filament coating composition can be different from the strand coating composition.

Non-limiting examples of suitable coating compositions include sizing compositions and secondary coating compositions. As used herein, the terms "size", "sized" or "sizing" refer to the aqueous composition applied to the filaments immediately after formation. The term "secondary coating" refers to a coating composition applied secondarily to one or a plurality of strands after the sizing composition is applied, and preferably at least partially dried. As used herein, the phrase "compatible with the thermoplastic matrix material" means that the components of the coating composition facilitate wetting of the matrix material upon the filaments or fiber strands and provide adequate physical properties in the composite.

The sizing composition preferably comprises one or more polymeric film forming materials which are compatible with the thermoplastic matrix material. Non-limiting examples of suitable film-forming materials for use in the present invention include thermoplastic materials, thermosetting materials and mixtures thereof.

Examples of suitable thermoplastic and thermosetting film-forming materials include acrylic polymers, aminoplasts, alkyds, polyepoxides, phenolics, polyamides, polyolefins, polyesters, polyurethanes, vinyl polymers, derivatives and mixtures thereof.

Useful acrylic polymers include polymers or copolymers of monomers such as acrylic acid; methacrylic acid; esters of these acids such as acrylates, methacrylates, ethylacrylate, propylacrylate and butylacrylate; polyglycidyl acrylates and methacrylates; acrylamides; acrylonitriles; and copolymers with unsaturated vinyl compounds such as styrene or vinyl acetate. Non-limiting examples of suitable acrylic polymers include FULATEX materials which are commercially available from H.B. Fuller Co. of St. Paul, Minn.; RHOPLEX acrylic emulsions which are commercially available from Rohm and Haas of Philadelphia, Pa.; and CARBOSET acrylic polymers which are commercially available from B.F. Goodrich Co. of Toledo, Ohio.

Useful aminoplasts include urea-formaldehyde and melamine formaldehyde. Useful epoxides contain at least one epoxy or oxirane group in the molecule, such as polyglycidyl ethers of polyhydric alcohols of thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Examples of suitable commercially available epoxy film-forming polymers are EPON® 826 and 828 epoxy resins, which are epoxy functional polyglycidyl ethers of bisphenol A prepared from bisphenol-A and epichlorohydrin and are commercially available from Shell Chemical.

Useful polyamides include the VERSAMID products which are commercially available from General Mills Chemicals, Inc. Suitable thermoplastic polyurethanes are condensation products of a polyisocyanate material and a hydroxyl-containing material such as polyol and include, for example, WITCOBOND® W-290H which is commercially available from Witco Chemical Corp. of Chicago, Ill. and RUCO 2011L which is commercially available from Ruco Polymer Corp. of Hicksville, N.Y. Suitable thermosetting polyurethanes include BAYBOND XW-110, which is commercially available from Bayer Corp. of Pittsburgh, Pa.

Non-limiting examples of useful vinyl polymers including RESYN 1971, RESYN 2828 and RESYN 1037 vinyl acetate copolymer emulsions which are commercially available from National Starch and Chemicals of Bridgewater, N.J. Other useful vinyl polymers include polyvinyl pyrrolidones such as PVP K-15, PVP K-30, PVP K-60 and PVP K-90 which are commercially available from ISP Chemicals of Wayne, N.J.

Non-limiting examples of useful polyolefins include polypropylene and polyethylene materials such as the polypropylene emulsion RL-5440, which is commercially available from Sybron Chemicals of Birmingham, N.J., and Polyemulsion CHEMCOR 43C30, which is commercially available from Chemical Corp. of America.

Non-limiting examples of useful polyester materials include RD-847A polyester resin which is commercially available from Borden Chemicals of Columbus, Ohio, STYPOL polyesters which are commercially available from Cook Composites and Polymers of Port Washington, Wis. and NEOXIL polyesters which are commercially available from DSM B.V. of Como, Italy. Thermoplastic polyesters useful in the present invention include ethylene adipates (such as DESMOPHEN 2000) and ethylene butylene adipates (such as DESMOPHEN 2001KS), both of which are commercially available from Bayer.

Preferred film-forming materials include a thermosetting urethane-modified polyglycidyl ether of bisphenol A emulsion which is commercially available as EPI-REZ® W60 5520 from Shell Chemical Company of Houston, Tex. and a maleic anhydride-modified polypropylene emulsion which is commercially available as Protolube RL-5440 from National Starch and Chemical Co. of Bridgewater, N.J.

The amount of film-forming material can be about 1 to about 90 weight percent of the sizing composition on a total solids basis, and is preferably about 60 to about 80 weight percent.

The sizing composition preferably comprises one or more glass fiber lubricants. Useful glass fiber lubricants include cationic, non-ionic or anionic lubricants and mixtures thereof. Generally, the amount of fiber lubricant can be about 1 to about 25 weight percent of the sizing composition on a total solids basis.

Non-limiting examples of such fiber lubricants include amine salts of fatty acids (which can, for example, including a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amid), condensates of a fatty acid and polyethylene imine and amide substituted polyethylene imines, such as EMERY® 6717, a partially amidated polyethylene imine commercially available from Henkel Corporation of Kankakee, Ill.

The sizing composition preferably also comprises one or more coupling agents. These coupling agents typically have dual functionality. Each metal or silicon atom has attached to it one or more groups which can react or compatibilize with the glass filament surface and/or the components of the sizing composition. As used herein, the term "compatibilize" with respect to coupling agents means that the groups are chemically attracted, but not bonded, to the glass filament surface and/or the components of the sizing composition, for example by polar, wetting or solvation forces. Examples of hydrolyzable groups include:

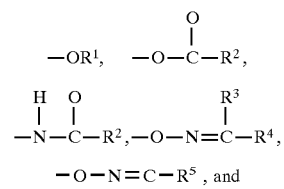

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ nd $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include A-187 gamma-glycidoxypropyltrimethoxysilane (preferred), A-174 gamma-methacryloxypropyltrimethoxysilane and A-1100 gamma-aminopropyltriethoxysilane silane coupling agents, each of which are commercially available from OSI Specialties, Inc. of Tarrytown, N.Y. The organo silane coupling agent can be at least partially hydrolyzed with water prior to application to the glass filaments, preferably at about a 1.3 stoichiometric ratio or, if desired, applied in unhydrolyzed form. The amount of coupling agent can be 1 to about 10 weight percent of the sizing composition on a total solids basis.

Crosslinking materials, such as the aminoplasts discussed above, can also be included in the sizing composition. Non-limiting examples of suitable crosslinkers include melamine formaldehyde, blocked isocyanates such as BAYBOND XW 116 or XP 7055, epoxy crosslinkers such as WITCOBOND XW by Witco Corp., and polyesters such as BAYBOND XP-7044 or 7056 which are commercially available from Bayer. The amount of crosslinker can be about 1 to about 25 weight percent of the sizing composition on a total solids basis.

The sizing composition can comprise one or more emulsifying agents for emulsifying components of the sizing composition. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils. Generally, the amount of emulsifying agent can be about 1 to about 20 weight percent of the sizing composition on a total solids basis.

The sizing composition can also include one or more aqueous dispersible or soluble plasticizers to improve flexibility. Examples of suitable non-aqueous-based plasticizers which are aqueous dispersible plasticizers include phthalates, trimellitates and adipates. An example of an aqueous soluble plasticizer is CARBOWAX 400, a polyethylene glycol which is commercially available from Union Carbide of Danbury, Conn. The amount of plasticizer is more preferably less than about 5 weight percent of the sizing composition on a total solids basis.

The coating composition preferably includes a polymeric amine such as ALUBRASPIN 230 tetrathylene pentamine chain-extended with diethyl succinate and octanoic acid to a molecular weight of about 1500, which is commercially available from PPG Industries, Inc. of Pittsburgh, Pa.

Fungicides, bactericides and anti-foaming materials and organic and/or inorganic acids or bases in an amount sufficient to provide the aqueous sizing composition with a pH of about 2 to about 10 can also be included in the sizing composition. Water (preferably deionized) is included in the sizing composition in an amount sufficient to facilitate application of a generally uniform coating upon the strand. The weight percentage of solids of the sizing composition generally can be about 4 to about 20 weight percent.

Preferred sizing compositions are disclosed in assignee's U.S. Pat. No. 5,437,928, which is hereby incorporated by reference. Non-limiting examples of other suitable sizing compositions are set forth in Loewenstein at pages 237–291, which are hereby incorporated by reference.

The sizing can be applied in many ways, for example by contacting the filaments with a static or dynamic applicator, such as a roller or belt applicator, spraying or other means. For a discussion of suitable applicators, see Loewenstein at pages 165–172, which is hereby incorporated by reference.

The sized filaments are preferably dried at room temperature or at elevated temperatures to remove excess moisture from the filaments and, if present, cure any curable sizing or secondary coating composition components. Drying of glass filament forming packages or cakes is discussed in detail in Loewenstein at pages 219–222, which is hereby incorporated by reference. For example, the forming package can be dried in an oven at a temperature of about 104° C. (220° F.) to about 160° C. (320° F.) for about 10 to about 24 hours to produce glass fiber strands having a dried residue of the composition thereon. The temperature and time for drying the glass filaments will depend upon such variables as the percentage of solids in the sizing composition, components of the sizing composition and type of glass filament. The sizing is typically present on the filaments in an amount ranging from about 0.3 percent to about 1.5 percent by weight after drying.

After drying the sized glass filaments can be gathered together into bundles or strands 14 of generally parallel filaments or roving and can be further treated with the secondary coating composition which is different from the sizing composition. The secondary coating composition can include one or more of the components of the sizing composition discussed above, and is preferably aqueous-based.

The mat 10 has am at surface weight greater than about 200 grams per square meter prior to needling. Preferably the mat surface weight ranges from about 500 to about 1200 grams per square meter prior to needling.

Referring now to FIG. 1, the overall width of the mat 10 can range from about 0.6 to about 3 meters (about 24 to about 120 inches), and preferably ranges from about 1.2 to about 2.4 meters (about 48 to about 96 inches).

The length of the mat 10 can vary based upon such factors as the desired length of the product to be transported to the customer. The mat is preferably formed by a generally continuous process as discussed below. Preferably, the length of the mat 10 ranges from about 60 to about 300 meters (about 200 to about 1000 feet), and more preferably about 180 to about 275 meters (about 600 to about 900 feet).

Figure 6:
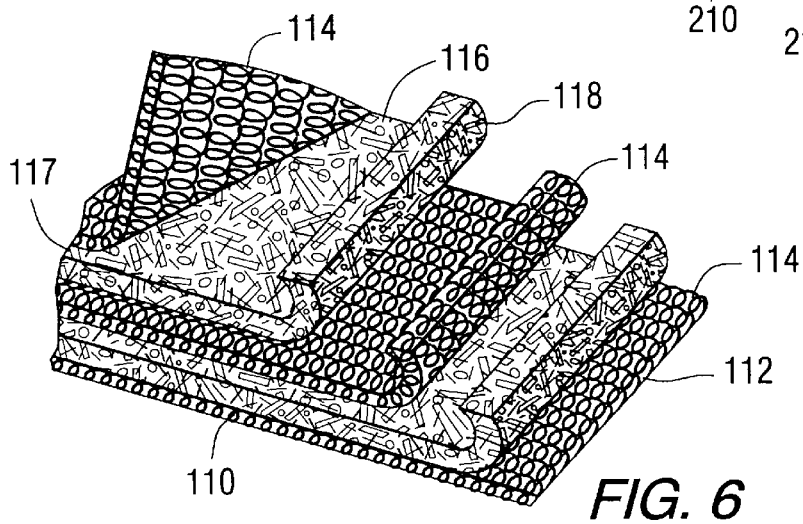
FIG. 6 is an enlarged schematic perspective view of an alternative embodiment of a mat according to the present invention.

In an alternative embodiment shown in FIG. 6, the mat 110 can further comprise a plurality of randomly oriented essentially continuous glass fibers 112. As used herein, the phrase "essentially continuous" means that the glass fibers 112 have a mean average length greater than about 10 meters to about 150 kilometers or more. Suitable glass compositions and nominal filament diameters are discussed in detail above. The essentially continuous glass fibers 112 can be formed as one or more layers 114 positioned within the mat 117 having the monofilaments and strands, adjacent the top side 116 and/or adjacent the bottom side 118 of the mat 117.

Figure 7:
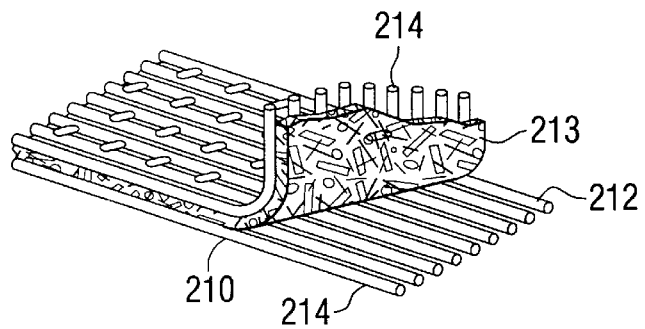
FIG. 7 is an enlarged schematic perspective view of another alternative embodiment of a mat according to the present invention.

In another alternative embodiment shown in FIG. 7, the mat 210 can further comprise a plurality of unidirectional essentially continuous glass fiber strands 212 and the mat 213 having the monofilaments and strands according to the present invention as discussed above. As used herein, the term "unidirectional" means that the essentially continuous glass fiber strands 212 are positioned in one or more layers 214 in generally, parallel alignment along the longitudinal axis of the mat 213.

Figure 8:
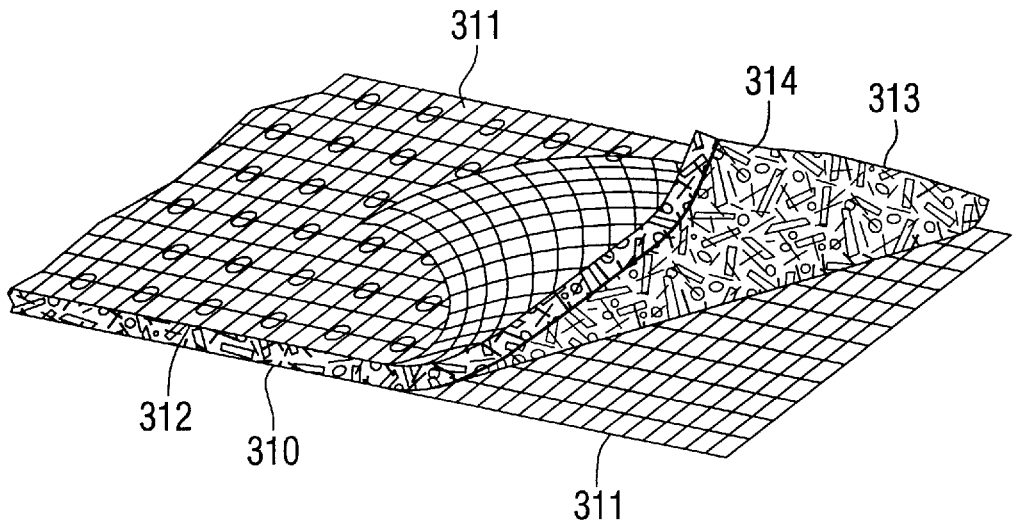
FIG. 8 is an enlarged schematic perspective view of another alternative embodiment of a mat according to the present invention.

In another alternative embodiment shown in FIG. 8, the mat 310 can further comprise one or more fabrics 311 positioned within the mat 313 having the monofilaments and strands, adjacent the top side 312 and/or adjacent the bottom side 314 of the mat 313. The fabric 311 can be formed from glass fibers, thermoplastic fibers and/or thermosetting fibers such as are discussed below. The fabric 311 can be formed as a nonwoven or woven material. A non-limiting example of a suitable nonwoven is a material formed from a slurry of discontinuous or non-continuous fibers. Suitable woven materials include those formed by weaving or knitting.

Figure 9:
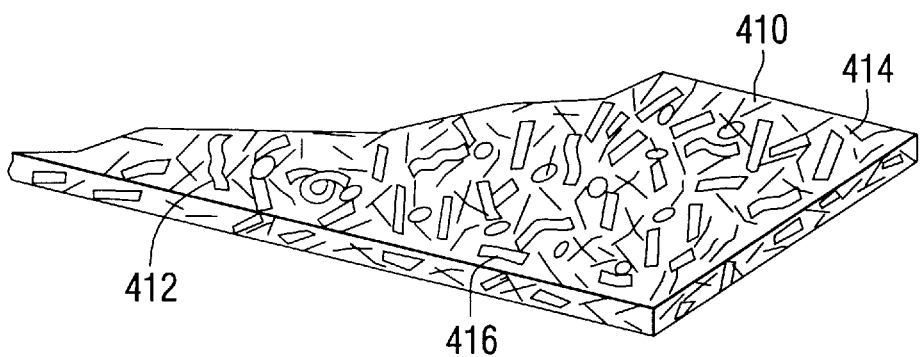
FIG. 9 is an enlarged schematic perspective view of yet another alternative embodiment of a mat according to the present invention.

In another alternative embodiment shown in FIG. 9, the mat 410 further comprises a plurality of generally continuous or discontinuous fibers and/or strands 412 formed from a material selected from the group consisting of thermoplastic materials, thermosetting materials and natural materials, such as cotton or jute, in addition to the glass monofilaments 414 and glass fiber strands 416.

Suitable man-made polymeric fibers can be formed from a fibrous or fiberizable material prepared from natural or synthetic organic polymers. Polymeric fibers believed to be useful in the present invention are discussed at length in the *Encyclopedia of Polymer Science and Technology,* Vol. 6 (1967) at pages 505–712, which is hereby incorporated by reference. As used herein, the term "fiberizable" means a material capable of being formed into a generally continuous filament, fiber, strand or yarn. Suitable man-made fibers include synthetic polymers such as polyamides, polyesters, acrylics, polyolefins, polyurethanes, vinyl polymers, derivatives and mixtures thereof. See *Encyclopedia of Polymer Science and Technology,* Vol. 6 at 506.

Suitable man-made fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology,* Vol. 6 at 507–508.

Non-limiting examples of useful polyamide fibers include nylon fibers such as nylon 6 (a polymer of caprolactam), nylon 6,6 (a condensation product of adipic acid and hexamethylene), nylon 12 (which can be made from butadiene) and nylon 10, polyhexamethylene adipamide, polyamide-imides and aramids such as KEVLAR™, which is commercially available from E.I. duPont de Nemours, Inc. of Wilmington, Del.

Thermoplastic polyester fibers useful in the present invention include those composed of polyethylene terephthalate and polybutylene terephthalate.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology,* Vol. 6 at 559–561.

Useful polyolefin fibers are generally composed of at least 85% by weight of ethylene, propylene, or other olefins. See *Encyclopedia of Polymer Science and Technology,* Vol. 6 at 561–564.

Fibers formed from vinyl polymers believed to be useful in the present invention can be formed from polyvinyl chloride, polyvinylidene chloride, polytetrafluoroethylene, and polyvinyl alcohol.

Further examples of thermoplastic fiberizable materials believed to be useful in the present invention are fiberizable polyimides, polyether sulfones, polyphenyl sulfones; polyetherketones, polyphenylene oxides, polyphenylene sulfides and polyacetals.

It is understood that blends or copolymers of any of the above materials and combinations of fibers formed from any of the above materials can be used in the present invention, if desired.

The polymeric fibers 412 of the mat 410 can comprise about 1 to about 15 weight percent (in the alternative embodiment) of the mat 410 on a total solids basis, and preferably about 1 to about 10 weight percent.

Preferably the mat is essentially free of inorganic fibers other than those discussed above, such as aluminosilicate fibers. As used herein, "essentially free of aluminosilicate fibers" means that the mat contains less than about 5 weight percent and is more preferably free of aluminosilicate fibers.

Referring now to FIGS. 1 and 2, the mat 110 can be treated or coated with an adhesive or polymeric binder material to promote consolidation of the mat prior to or after needling, although user of a binder is not preferred. Non-limiting examples of useful polymeric binders include polyvinyl acetate, polyesters and polypropylene. Suitable polymeric binders can be in the form of a powder, fiber or emulsion, as desired. The binders are consolidated with the mat by the application of heat and pressure, such as by passing the mat between heated calendering rolls.

Figure 4:
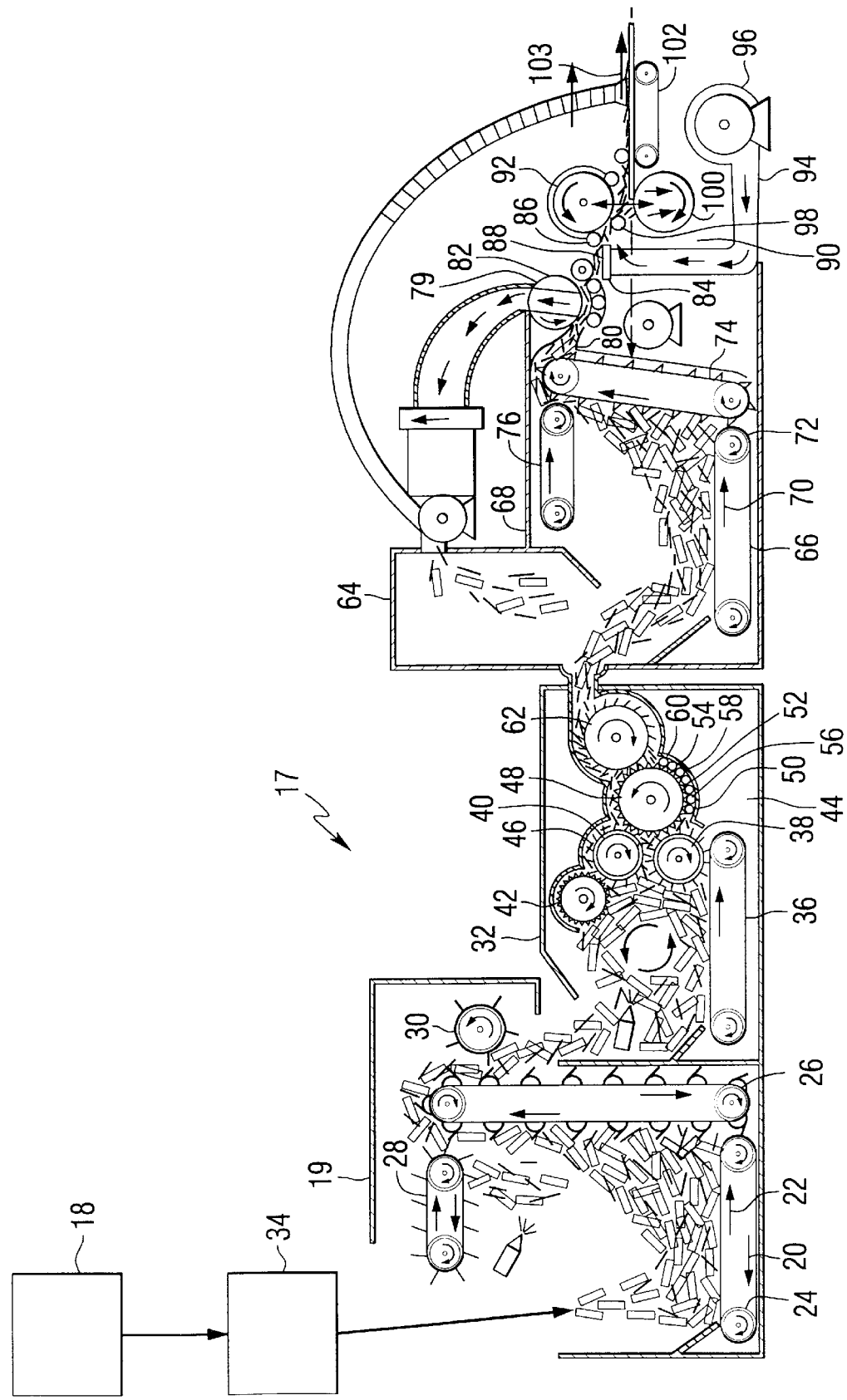
FIG. 4 is a schematic side elevational view of a first portion of a preferred system for forming a mat according to the present invention.

Referring now to FIG. 4, the mat 10 can be formed using a mat forming apparatus 17 comprising one or more fiber strand supplies 18. Preferably, the strand supply 18 comprises a plurality of forming or supply packages mounted upon a creel. Conventional creels suitable for use in the present invention are shown in Loewenstein at page 315, which is hereby incorporated by reference. The supply packages can be wound such that the strand 14 can be withdrawn from the inside of the supply package or from the outside of the supply package (known in the art as "filling wind"). The dimensions of the supply package can vary, depending upon such variables as the diameter and type of fiber wound thereon, and are generally determined by convenience for handling and processing. Generally, supply packages are about 20 to about 30 centimeters in diameter and have a length of about 30 to about 100 centimeters.

In an alternative embodiment, the strand supply 18 comprises a filament forming apparatus which comprises a glass melting furnace or forehearth containing a supply of a filament forming mass or molten glass and having a precious metal bushing or spinneret attached to the bottom of the forehearth. The busing is provided with a series of orifices in the form of tips through which molten glass is drawn in the form of individual fibers or monofilaments at a high rate of speed. Such filament forming apparatus are well known to those skilled in the art and further discussion thereof is not believed to be necessary in view of the present disclosure. Suitable filament forming apparatus are discussed in Loewenstein at pages 22–27 and 119–151, which are hereby incorporated by reference.

The glass filaments can be cooled by spraying with water and coated with a sizing by an applicator as discussed above. After application of the sizing, the glass filaments are gathered by an alignment device which aligns each of the filaments to form one or more strands 14 in which each of the filaments 12 is generally adjacent and coplanar (in side-by-side or generally parallel alignment). Non-limiting examples of suitable alignment devices include rotatable or stationary gathering shoes or a comb, as discussed in Loewenstein at page 173, which is hereby incorporated by reference. Preferably, the number of strands ranges from 1 to about 10 strands and, more preferably, 1 to about 6 strands.

Preferably the strands 14 are formed from generally continuous strands which are chopped by a chopper 34 into discontinuous lengths having a mean average length such as discussed above. The chopper 34 can be positioned proximate the conveyor 20 such that chopped strands ejected from the chopper 34 are deposited upon the conveyor 20. Alternatively, the strands can be chopped at a location spaced apart from and remote to the mat forming apparatus and transported to the mat forming apparatus.

Preferably the chopper dispenses about 0.5 to about 12 grams of strand 14 per minute per linear millimeter width (about 5 to about 120 ounces per minute per linear foot width). The amount of chopped strand per unit area deposited upon conveyor is also a function of the conveyor speed.

A non-limiting example of a suitable chopper 34 is the Model 90 chopper which is commercially available from Finn and Fram Inc. of California.

The chopped strands preferably have on at least a portion of the surfaces thereof the essentially dried residue of a coating or sizing composition as discussed in detail above.

For supplying a synthetic fibers in the alternative embodiment, the fiber forming apparatus can be, for example, a forming device for synthetic textile fibers or strands, the methods and apparatus for which are discussed in detail above.

Also, an antistatic agent for example an amine, amide or quaternary salt such as soyadimethyl and ethylammonium ethosulfate can be applied to the filaments or strands prior to deposition upon the conveyor, if desired.

The mat forming apparatus 17 also comprises a hopper 19 for collecting the chopped fiber strands 14 received from the fiber strand supply 18. The hopper 19 includes a preferred conveyor 20 having a surface which is driven in a direction 22 by a pair of spaced drive rollers 24 which are rotated by a motor (not shown). The speed of the prefeed conveyor 20 can range up to about 30 feet per minute. Preferably, the prefeed conveyor 20 is positioned adjacent to an elevating conveyor 26 which includes a plurality of protrusions or pins which facilitate conveying of the strands 14. The speed of the elevating conveyor 26 can range up to about 300 feet per minute.

A stripper 28 removes excess strands 14 from the elevating conveyor 26. The speed of the stripper 28 preferably ranges up to about 300 feet per minute. A doffer roll 30 positioned adjacent a portion of the elevating conveyor 26 on a side opposite the hopper 19 meters the strands 14 being discharged from the elevating conveyor 26 for feeding the strands at an essentially uniform rate to a strand opener 32. The doffer roll 30 preferably rotates at about 300 to about 500 revolutions per minute (rpm). The stripper 28 and doffer roll 30 can partially open or filamentize a relatively small percentage of the strands 14, generally less than about 5 weight percent.

A preferred apparatus having a suitable hopper 19, conveyors 20, 26, stripper 28 and doffer roll 30 is commercially available from Rando, Inc. of Macedon, N.Y. as the RANDO PREFEEDER, part of the MODEL B RANDO-WEB® processor. See "From Bale to Nonwoven Web in one Continuous Operation", a publication of Rando, Inc. (September 1990) at pages 4–5, which are hereby incorporated by reference. Other suitable conveyors are well known to those skilled in the art.

As shown in FIG. 4, the strand opener 32 receives the chopped strand 14 from the conveyor 26 and doffer roll 30. Preferably the strand opener 32 comprises a conveyor 36 which feeds the chopped strand 14 to a pair of opposed wire cloth rolls 38, 40 and a mating stripper roll 42, which causes the strand 14 to circulate in the hopper 44 and at least partially opens or filamentizes the strand 14. The partially opened strand 46 passes between the rolls 38, 40 to the main roll 48, which engages a plurality of small metallic clothed rolls 50, 52 and 54 and corresponding stripper rolls 56, 58 and 60. The rolls 38, 40 preferably rotate at a speed of about 100 to about 200 rpm. The metallic clothed rolls 50, 52 and 54 and corresponding stripper rolls 56, 58 and 60 preferably rotates at a speed of up to about 30 rpm. The partially opened strand 46 is doffed from the main roll 48 by a doffer roll 62 which transports the partially opened strand 46 to a strand feeder 64.

The percentage of strand 14 filamentized can be adjusted by adjusting the tolerances between the mating rolls of the strand opener 32, the rotational speed of the rolls and conveyors and by the selection of components for the coating composition and loss on ignition of the coating composition on the glass. The filamentization can also be controlled by using different coating compositions having different adhesive properties on separate portions of the glass supply. As discussed in detail above, preferably at least about 30 weight percent of the strand 14 in the mat is filamentized.

A preferred strand opener 32 is a RANDO-OPENER BLENDER, part of the MODEL B RANDO-WEB® processor discussed above.

Alternatively, the strand opener 32 can be a carding machine, such as are commercially available from Hollingsworth on Wheels, Inc. of Greenville, S.C. or N. Schulumberger (USA) Inc. of Charlotte, N.C.

The strand feeder 64 is positioned to receive the partially opened strands 46 from the doffer roll 62. The partially opened strands 46 drop onto a conveyor 66 within the hopper 68 of the strand feeder 64. The conveyor 66 has a surface which is driven in a direction 70 by a pair of spaced drive rollers 72 which are rotated by a motor (not shown). The speed of the conveyor 66 preferably ranges up to about 30 feet per minute. Preferably, the conveyor 66 is positioned adjacent to an elevating conveyor 74 and stripper 76 configured similarly to the conveyors 20, 26 and stripper 28 discussed above.

A preferred strand feeder 64 is a RANDO-FEEDER, part of the MODEL B RANDO-WEB® processor discussed above.

The partially opened strands 46 are conveyed to a mat former 79 by an air stream 80 to deposit upon the surface of a driven cylindrical vacuum condenser screen 82 maintained at a pressure below atmospheric pressure, such as about 0.24 to about 1.49 kPa. The condenser screen 82 preferably rotates at a speed up to about 30 rpm. The preformed mat 88 is formed upon the screen 82 and doffed onto the feed plate 84 and under the feed roll 86. The rotational speed of the condenser screen 82 is synchronized with the rotational speed of the feed roll 86 by synchronizing the respective drives. The feed roll 86 preferably rotates at a speed up to about 10 rpm.

The feed roll 86 feeds the preformed mat 88 into a concave surface of a nose bar 90 which exerts a holding action as the preformed mat 88 is fed over the nose bar 90 and individual strands 14 and monofilaments 12 are combed from the preformed mat 88 by the lickerin 92. The lickerin 92 preferably rotates at a speed of up to about 3500 rpm. The strands 14 and monofilaments 12 are introduced into an air stream 94 generated by a fan 96. The velocity of the air stream 94 is controlled by adjusting a saber 98 which is set in eccentric bushings. The strands 14 and monofilaments 12 are deposited in the form of mat 10 upon the surface of a driven cylindrical vacuum condenser screen 100 at an angle 101 of about 90° to a plane 103 tangent to the surface of the vacuum condenser screen 100 and which is maintained at a pressure below atmospheric pressure, such as about 0.24 to about 1.49 kPa.

A preferred mat former 79 is a RANDO-WEBBER® having a J-type cover, part of the MODEL B RANDO-WEB® processor discussed above.

The mat 10 is conveyed from the mat former 79 to the needler 104 by a conveyor 102. Any conventional conveyor, such as a chain or mesh conveyor, can be used to transport the mat 10 from the mat former 79 to the needler 104.

Prior to needling, the mat 10 can be combined with unidirectional glass, thermoplastic or thermosetting fiber strands and/or fabrics such as are discussed above. The unidirectional strands can be fed from a creel having a plurality of supply packages to align the unidirectional strands in generally parallel and coplanar alignment. The unidirectional strands and/or fabric can be positioned between layers of the mat 10 or adjacent the top side 116 or bottom side 116 of the mat, as desired.

Figure 5:
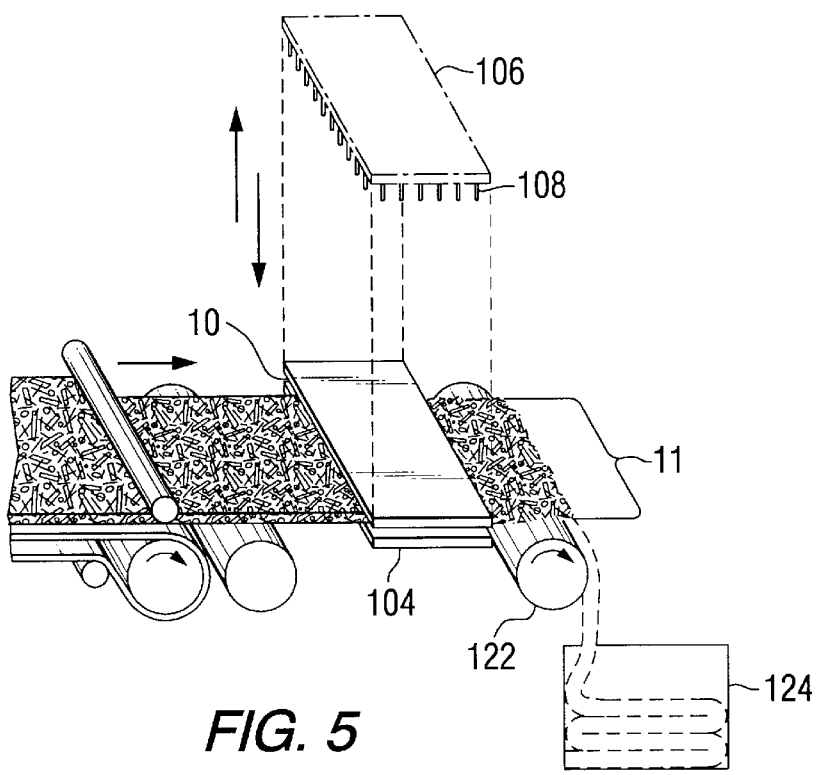
FIG. 5 is a schematic perspective view of a second portion of the preferred system for forming a mat according to the present invention.

Referring now to FIG. 5, the glass monofilaments 12 and glass fiber strands 14 of the mat 10 are entangled by needling the glass monofilaments 12 and glass fiber strands 14 (and any unidirectional strands or fabric, if present) together. The needling can be accomplished by passing the mat 10 through a needler 104 between generally known spaced needling boards 106, such as are disclosed in assignee's U.S. Pat. No. 4,277,531, which is hereby incorporated by reference.

A plurality of spaced needles 108 are used to entangle or intertwine the monofilaments 12 and strands 14 of the mat 10 to impart mechanical strength and integrity to the mat 10. The needles 108 are constructed and arranged with a barb which entangles the monofilaments 12 and strands 14 contained in the mat 10 as the barb passes through the mat forming aperture on the downward stroke of the vertical reciprocation of the needles and preferably releases the monofilaments 12 and strands 14 contained within the mat 10 during the upward stroke of the reciprocating needler 104. Alternatively, needles with reverse barbs can be used to form the mat 10 of the present invention.

As used herein, the term "horizontal(ly)" means that the direction of movement is generally parallel with respect to ground. As used herein, the terms "vertical(ly)", "downwardly" and "upwardly" refer to direction of movement which is generally perpendicular with respect to ground.

During vertical upward movement, the needles 108 are passed through a plurality of generally cylindrical orifices in a metal stripper plate (not shown for clarity in the drawings) which rests upon the mat 10 during its passage through the needler 104. The filaments 12 and strands 14 are thus pulled from the surface of the barb as the mat 10 proceeds in horizontal direction after a stroke of the needle 108 in a downward and upward direction. The mat 10 passes over a metal bed plate having a plurality of generally cylindrical orifices therethrough aligned with the orifices of the stripper plate through which the needles 108 pass on the downward stroke of the needleboard 106.

The needleboard 106 can be reciprocated such that a full stroke (downward and upward motion) occurs in a period of about 100 to about 1000 strokes per minute and upon completion of each reciprocation rolls are provided in association with the needler 104 to move the mat 10 in generally horizontal direction in preparation for the successive downward stroke of the needleboard. A non-limiting example of a suitable needling machine is Model NL 9 which is commercially available from Textilmaschinefabrik Dr. Ernest Fehrer AG of Germany.

Figure 3:
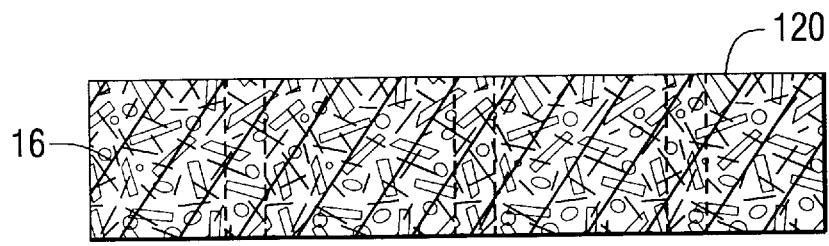
FIG. 3 is an enlarged schematic cross sectional view of a composite according to the present invention.

The length of the needle 108, the depth of the penetration of the needle 108 through the mat 10 during its passage through the needler 104 and the extent to which the filaments 12 and strands 14 entangled 13 in the barb of the needle 108 are moved in a generally vertical upward direction through the mat 10 during the upward stroke of the needler 104 determine the extent to which impact strength can be imparted to the composite 120 (shown in FIG. 3) incorporated the mat 10 as reinforcement.

Preferably, the gauge of the needle 108 ranges from about 32 to about 19 gauge, with a combination of 25 and 32 gauge needles being preferred. The punch density is preferably about 12 to about 47 punches per square centimeter (about 75 to about 300 punches per square inch).

The punching depth or degree of penetration of the needles 108 into the orifices of the bed plate preferably ranges from about 8 to about 18 millimeters (about 0.3 to about 0.7 inches). In a typical needling process, the mat 10 entering the needler 104 can have an overall average thickness of about 8 to about 100 millimeters. After passage throughout the needler 104, the mat 10 can have a compressed overall average thickness of about 3 to about 20 millimeters (about 0.125 to about 0.75 inches). The needling process is described in further detail in assignee's U.S. Pat. No. 4,335,176, which is hereby incorporated by reference.

The surface weight of the mat 10 after needling can range from about 200 to about 1200 grams per square meter. The overall width 11 of the mat 10 can range from about 0.6 to about 3 meters (about 24 to about 120 inches), and preferably ranges from about 1.2 to about 2.4 meters (about 48 to about 96 inches).

An advantage of such a mat is that it can be readily handled after formation and packaged in a convenient form for transportation to a customer. For example, as shown in FIG. 5, the mat 10 can be rolled to form a roll 122 or festooned or severed into predetermined lengths and packaged in a conventional container 124 of suitable dimensions for shipment to the customer.

The mat 10 can be used to reinforce a thermoplastic matrix material 16 to form a polymeric composite 120. Non-limiting examples of suitable polymeric thermoplastic materials include polyolefins, polyamides, thermoplastic polyurethanes, thermoplastic polyesters, acrylic polymers, vinyl polymers, derivatives and mixtures thereof.

Non-limiting examples of useful polyolefins include polyethylene, extended-chain polyethylene, polypropylene, polybutene, polyisoprene, and polypentene, polymethyl pentene, polytetrafluoroethylene and neoprene. Preferably the thermoplastic matrix material 16 is polypropylene.

Useful polyamides include nylons such as nylon 6 (a polymer of caprolactam), nylon 12 (which can be made from butadiene), nylon 66 (a condensation product of adipic acid and hexamethylenediamine), nylon 10 and nylon 12 such as are commercially available from DuPont. Other examples of useful polyamides include polyhexamethylene adipamide and aramids such as Kevlar™, which is commercially available from duPont.

Suitable thermoplastic polyurethanes are condensation products of a polyisocyanate material and a hydroxyl-containing material such as polyol and include, for example, Estane and Texin polyurethanes which are commercially available from B.F. Goodrich of Toledo, Ohio and Bayer, respectively.

Thermoplastic polyesters useful in the present invention include polyethylene terephthalate and polybutylene terephthalate. Acrylic polymers useful in the present invention include polyacrylates, polyacrylamides and polyacrylonitriles such as nitrile rubber.

Useful vinyl polymers include polyvinyl chloride, polyvinylidene chloride (saran), polyvinyl fluoride, polyvinylidene fluoride, ethylene vinyl acetate copolymers, such as Elvax which is commercially available from duPont, and polystyrenes.

Thermoplastic elastomeric materials useful as matrix materials in the present invention include styrene-butadiene rubbers, styrene-acrylonitrile (SAN) copolymers such as Lustran, which is commercially available from Monsanto of St. Louis, Mo., styrene-butadiene-styrene (SBS) copolymers and acrylonitrile-butadiene-styrene (ABS) copolymers, such as Cycolac or Blendex, which are commercially available from GE Plastics of Pittsfield, Mass.

Further examples of useful thermoplastic materials include polyimides including polyether imides such as Ultem, which is commercially available from GE Plastics; polyether sulfones, such as Victrex which is commercially available from ICI Americas, Inc. of Wilmington, Del.; polyphenyl sulfones such as Radel R which is believed to be commercially available from Amoco; polyetherketones including polyetheretherketones (PEEK) such as Ultra Pec, which is commercially available from BASF Corp. of Parsippany, N.J.; polyphenylene oxides such as Noryl, which is commercially available from G.E. Plastics; polyphenylene sulfides such as Ryton R which is commercially available from Phillips Chemical Co. of Houston, Tex.; polyacetals such as Celcon, which is commercially available from Hoechst Celanese Corp. of Chatham, N.J.; polyvinyl chlorides; and polycarbonates such as Lexan, which is commercially available from G.E. Plastics, and Makrolon, which is commercially available from Bayer. Also included as suitable thermoplastic materials are any of the above thermoplastics which are modified by an unsaturated monomer.

Other components which can be included with the thermoplastic matrix material 16 and mat 10 in the composite 120 are, for example, colorants or pigments, lubricants or process aids, ultraviolet light (UV) stabilizers, antioxidants, other fillers, and extenders.

The thermoplastic matrix material 16 can be formed into a composite 120 with the mat 10 by a variety of methods which are dependent upon such factors as the type of thermoplastic matrix material 16 used. The composite 120 can be formed by first forming a laminate by the mat 10 and thermoplastic matrix material 16 and then compression molding or stamping the laminate. To form the laminate the thermoplastic matrix material 16 can be impregnated into the mat 10 and then the impregnated mat can be heated in a oven, such as a conventional continuous oven well know to those skilled in the art, at a temperature of about 190° C. to about 240° C. for about 7 minutes. The laminate can be transferred to a mold and heated under pressure to a temperature which can vary based upon the resin selected. For example, for polypropylene, the molding temperature can be about 65° C. The pressure for forming such a laminate can be about 14 MPascals. One skilled in the art would understand that the laminating and molding temperatures and pressure can vary based upon such factors as the dimensions and structure of the composite to be formed and the thermoplastic matrix material.

A method according to the present invention for making a mat adapted to reinforce a thermoplastic matrix material will now be described generally.

With reference to FIGS. 4 and 5, the method generally comprises the initial step of mixing a plurality of glass monofilaments 12 with a plurality of glass fiber strands 14 to form an essentially uniform mixture as discussed above. The mixture of glass monofilaments 12 and glass fiber strands 14 is dispensed onto the collector or conveyor to form a mat 10 such as is discussed in detail above.

The monofilaments 12 and glass fiber strands 14 of the mat 10 are entangled by needling the monofilaments 12 and glass fiber strands 14 together to form the mat 10. Suitable needlers and the methods for needling are discussed in detail above.

A method according to the present invention for reinforcing a thermoplastic matrix material to form a reinforced composite will now be described generally. The method generally comprises the initial step of coating and impregnating at least a portion of the mat discussed above with a thermoplastic matrix material. The thermoplastic matrix material is heated to a temperature sufficient to permeate the mat and is cooled to ambient temperature to provide a reinforced thermoplastic composite, as discussed above.

The present invention will now be illustrated by the following specific, non-limiting example.

EXAMPLE

An aqueous sizing composition prepared according to U.S. Pat. No. 5,437,928 was applied to K and N filament E-glass fibers and the fibers were gathered into bundles of about 800 and 1600 fibers per bundle, wound onto individual forming packages and chopped into lengths of about 76.2 millimeters (about 3 inches) and about 152.4 millimeters (about 6 inches) (as set forth in Table 1 below) in a manner similar to that discussed above in the specification. The weight of sizing composition on the fibers after drying the forming packages at a temperature of about 140° C. for about 10 hours (loss on ignition) was about 0.55 and 1.00 weight percent, respectively. These fibers were used to form a mat according to the present invention, as discussed below.

TABLE 1

| Sample No. | Strand Length (mm) | Strand Length (in.) | Filaments per Bundle | Loss on Ignition (%) | Fiber Type and Diameter (micrometer) |
|---|---|---|---|---|---|
| 1 | 76.2 | 3 | 800 | 0.55 | K 13 |
| 2 | 152.4 | 6 | 800 | 0.55 | K 13 |
| 3 | 76.2 | 3 | 1600 | 0.55 | K 13 |
| 4 | 152.4 | 6 | 1600 | 0.55 | K 13 |
| 5 | 76.2 | 3 | 800 | 1 | K 13 |
| 6 | 152.4 | 6 | 800 | 1 | K 13 |
| 7 | 76.2 | 3 | 1600 | 1 | K 13 |
| 8 | 152.4 | 6 | 1600 | 1 | K 13 |
| 9 | 76.2 | 3 | 800 | 0.55 | N 16.5 |
| 10 | 152.4 | 6 | 800 | 0.55 | N 16.5 |
| 11 | 76.2 | 3 | 1600 | 0.55 | N 16.5 |
| 12 | 152.4 | 6 | 1600 | 0.55 | N 16.5 |
| 13 | 76.2 | 3 | 800 | 1 | N 16.5 |
| 14 | 152.4 | 6 | 800 | 1 | N 16.5 |
| 15 | 76.2 | 3 | 1600 | 1 | N 16.5 |
| 16 | 152.4 | 6 | 1600 | 1 | N 16.5 |

Mats were prepared from the above glass fiber strands using the MODEL B RANDO-WEB® processor as discussed above.

Each mat was needled using a Morrison needler having 30 gauge needles at a punch density of about 12.4 punches per square centimeter (about 80 punches per square inch) to a depth of about 14 millimeters (about 0.55 inches). Two types of mats ("A" and "B") were produced from each sample. Mat type A had a mat surface weight of about 630 grams per square meter (about 2.1 ounces per square foot), a thickness of about 7.65 millimeters (about 0.301 inches), and about 80 to about 85 percent monofilaments on a total solids basis. Mat type B had a mat surface weight of about 885 grams per square meter (about 2.95 ounces per square foot), a thickness of about 7.98 millimeters (about 0.314 inches), and about 80 to about 85 percent monofilaments on a total solids basis.

The above glass fiber strand samples were used to produce mats which were laminated, stamped and molded into composites with various polypropylene thermoplastic matrix materials as set forth below. Two layers of each Sample of Mat type A were laminated in alternating layers between three sheets of BOREALIS 100 MF (melt flow index of 100 according to ASTM D3835-79 (1983)) polypropylene[1]. Each of these laminates (Examples 1A through 16A) contained about 30 weight percent glass on a total solids basis. Two layers of each Sample of Mat type B were laminated in alternating layers between three sheets of BOREALIS 400 MF (melt flow index of 400 according to ASTM D3835-79 (1983)) polypropylene[2]. Each of these laminates (Examples 1B through 16B) contained about 40 weight percent glass on a total solids basis.

[1] BOREALIS 100 MF (Melt Flow Index) polypropylene is commercially available from Ashland Chemical Co. of Dublin, Ohio.
[2] BOREALIS 400 MF (Melt Flow Index) polypropylene is commercially available from Ashland Chemical Co. of Dublin, Ohio.

The laminates were prepared using a Wabash Laminator which is commercially available from Wabash Metal Products, Inc. of Wabash, Ind. The laminates of Examples 1A through 16A were formed at a temperature of about 232° C. (about 450° F.), a pressure of about 228 to about 283 Pascals (about 33 to about 41 pounds per square inch) for about 8 minutes. The laminates of Examples 1B through 16B were formed at a temperature of about 232° C. (about 450° F.), a pressure of about 283 to about 338 Pascals (about 41 to about 50 pounds per square inch) for about 8 minutes. The dimensions of each laminate formed were about 559 millimeters in width, about 559 millimeters in length and about 3.8 millimeters thick (about 22 inches in width, about 22 inches in length and about 0.15 inches thick).

The laminates of each of Examples 1A through 16A and 1B through 16B were trimmed to about 229 millimeters (about 9 inches) width and about 229 millimeters (about 9 inches) length each, stacked into two layers and compression molded (stamped) using a Lawton 500T molding apparatus which is commercially available from Lawton, C. A., Co. of De Pere, Wis. The laminates were preheated in the mold at a temperature of about 204° C. (about 400° F.) for about 80 seconds and molded at a temperature of about 49° C. (about 120° F.) and pressure of about 22 kiloPascals (about 230 tons per square foot) for about 30 seconds to form about 317.5 millimeters width, 317.5 millimeters length and 3.2 millimeters thickness (about 12.5 inch width, 12.5 inch length and 0.125 inch thickness) composite plaques.

Each plaque was evaluated for: tensile strength and tensile modulus according to ASTM Method D-638-92; flexural strength and flexural modulus according to ASTM Method D-790-92; Izod impact strength according to ASTM Method D-256-92; Dynatup Impact according to ASTM Method D3029-90. Each of the reported results for tensile strength, tensile modulus, flexural strength, flexural modulus and Izod impact strength for each plaque is the average value calculated from results evaluated for testing of the selected property in the machine direction and tensile direction. The results of these evaluations are set forth in Tables 2–5.

TABLE 2

| EXAMPLE | Tensile Strength (psi) | Tensile Strength MPa | Tensile Modulus (kpsi) | Tensile Modulus MPa | Flexural Strength (psi) | Flexural Strength MPa | Flexural Modulus (kpsi) | Flexural Modulus MPa |
|---|---|---|---|---|---|---|---|---|
| Example 1A | 12130 | 83.7 | 558 | 3850 | 18335 | 126.5 | 787 | 5430.3 |
| Example 2A | 12684 | 87.5 | 616 | 4250 | 16425 | 113.3 | 680 | 4692 |
| Example 3A | 11178 | 77.1 | 701 | 4837 | 16945 | 116.9 | 732 | 5050.8 |
| Example 4A | 12603 | 87.0 | 605 | 4175 | 18105 | 124.9 | 725 | 5002.5 |
| Example 5A | 11892 | 82.1 | 522 | 3602 | 15990 | 110.3 | 694 | 4788.6 |
| Example 6A | 13311 | 91.8 | 630 | 4347 | 20050 | 138.3 | 806 | 5561.4 |
| Example 7A | 11757 | 81.1 | 564 | 3892 | 17935 | 123.8 | 722 | 4981.8 |
| Example 8A | 12495 | 86.2 | 561 | 3871 | 19450 | 134.2 | 786 | 5423.4 |
| Example 9A | 11497 | 79.3 | 569 | 3926 | 17170 | 118.5 | 751 | 5181.9 |
| Example 10A | 11451 | 79.0 | 629 | 4340 | 16945 | 116.9 | 714 | 4926.6 |
| Example 11A | 12241 | 84.5 | 624 | 4306 | 19645 | 135.6 | 799 | 5513.1 |
| Example 12A | 10878 | 75.1 | 541 | 3733 | 16435 | 113.4 | 705 | 4864.5 |
| Example 13A | 12229 | 84.4 | 629 | 4340 | 18900 | 130.4 | 754 | 5202.6 |
| Example 14A | 12171 | 84.0 | 610 | 4209 | 17395 | 120.0 | 687 | 4740.3 |
| Example 15A | 11107 | 76.6 | 597 | 4119 | 17165 | 118.4 | 716 | 4940.4 |
| Example 16A | 11763 | 81.2 | 628 | 4333 | 16220 | 111.9 | 654 | 4512.6 |

TABLE 3

| EXAMPLE | IZOD Impact (ft lb$_m$ per in) | IZOD Impact J/m | DYNATUP Impact (ft lb$_m$) | DYNATUP Impact J |
|---|---|---|---|---|
| Example 1A | 3.30 | 176 | 12.46 | 16.9 |
| Example 2A | 3.85 | 206 | 10.87 | 14.7 |
| Example 3A | 3.61 | 193 | 12.75 | 17.3 |
| Example 4A | 3.80 | 203 | 12.75 | 17.3 |
| Example 5A | 3.22 | 172 | 13.96 | 18.9 |
| Example 6A | 3.69 | 197 | 15.25 | 20.7 |
| Example 7A | 3.58 | 191 | 10.71 | 14.5 |
| Example 8A | 3.57 | 137 | 13.49 | 18.3 |
| Example 9A | 3.37 | 180 | 12.08 | 16.4 |
| Example 10A | 3.33 | 178 | 13.72 | 18.6 |
| Example 11A | 3.39 | 181 | 11.31 | 15.3 |
| Example 12A | 2.99 | 160 | 14.15 | 19.2 |
| Example 13A | 3.89 | 208 | 13.87 | 18.8 |
| Example 14A | 3.62 | 193 | 13.13 | 17.8 |
| Example 15A | 3.85 | 206 | 12.27 | 16.6 |
| Example 16A | 3.83 | 205 | 12.97 | 17.6 |

TABLE 4

| EXAMPLE | Tensile Strength (psi) | Tensile Strength MPa | Tensile Modulus (kpsi) | Tensile Modulus MPa | Flexural Strength (psi) | Flexural Strength MPa | Flexural Modulus (kpsi) | Flexural Modulus MPa |
|---|---|---|---|---|---|---|---|---|
| Example 1B | 13828 | 95.4 | 890 | 6141 | 18795 | 129.7 | 845 | 5831 |
| Example 2B | 13503 | 93.2 | 954 | 6583 | 17710 | 122.2 | 836 | 5768 |
| Example 3B | 12316 | 85.0 | 733 | 5058 | 19365 | 133.6 | 838 | 5782 |
| Example 4B | 14351 | 99.0 | 713 | 4920 | 20780 | 143.4 | 915 | 6314 |
| Example 5B | 11956 | 82.5 | 927 | 6396 | 20075 | 138.5 | 811 | 5596 |

TABLE 4-continued

| EXAMPLE | Tensile Strength (psi) | | Tensile Modulus (kpsi) | | Flexural Strength (psi) | | Flexural Modulus (kpsi) | |
|---|---|---|---|---|---|---|---|---|
| | (psi) | MPa | (kpsi) | MPa | (psi) | MPa | (kpsi) | MPa |
| Example 6B | 13754 | 94.9 | 754 | 5203 | 19880 | 137.2 | 856 | 5906 |
| Example 7B | 14018 | 96.7 | 830 | 5727 | 19290 | 133.1 | 858 | 5920 |
| Example 8B | 12917 | 89.1 | 766 | 5285 | 18920 | 130.5 | 798 | 5506 |
| Example 9B | 12179 | 84.0 | 805 | 5555 | 18480 | 127.5 | 845 | 5831 |
| Example 10B | 15052 | 103.9 | 863 | 5955 | 18855 | 130.1 | 849 | 5858 |
| Example 11B | 11423 | 78.8 | 672 | 4637 | 19030 | 131.3 | 841 | 5803 |
| Example 12B | 13836 | 95.5 | 887 | 6120 | 19760 | 136.3 | 876 | 6044 |
| Example 13B | 13328 | 92.0 | 872 | 6017 | 18125 | 125.1 | 767 | 5292 |
| Example 14B | 14683 | 101.3 | 761 | 5251 | 20790 | 143.5 | 825 | 5693 |
| Example 15B | 12635 | 87.2 | 785 | 5417 | 17820 | 123.0 | 834 | 5755 |
| Example 16B | 13766 | 95.0 | 755 | 5210 | 20190 | 139.3 | 845 | 5831 |

TABLE 5

| EXAMPLE | IZOD Impact | | DYNATUP Impact | |
|---|---|---|---|---|
| | (ft lb$_m$ per in) | J/m | (ft lb$_m$) | J |
| Example 1B | 5.53 | 295 | 12.10 | 16.4 |
| Example 2B | 4.72 | 252 | 10.68 | 14.5 |
| Example 3B | 4.01 | 214 | 12.27 | 16.6 |
| Example 4B | 4.69 | 250 | 12.43 | 16.8 |
| Example 5B | 4.51 | 241 | 12.97 | 17.6 |
| Example 6B | 5.36 | 286 | 13.27 | 18.0 |
| Example 7B | 4.20 | 224 | 12.01 | 16.3 |
| Example 8B | 5.66 | 302 | 13.28 | 18.0 |
| Example 9B | 4.26 | 227 | 11.80 | 16.0 |
| Example 10B | 4.42 | 236 | 13.03 | 17.7 |
| Example 11B | 4.52 | 241 | 11.73 | 15.9 |
| Example 12B | 4.11 | 219 | 12.97 | 17.6 |
| Example 13B | 4.65 | 248 | 12.83 | 17.4 |
| Example 14B | 4.55 | 243 | 12.75 | 17.3 |
| Example 15B | 4.90 | 262 | 11.95 | 16.2 |
| Example 16B | 4.36 | 233 | 13.50 | 18.3 |

As shown in Tables 2–5 above, the results of physical property testing of the above samples indicate that composites including the mat of the present invention have good physical properties including but not limited to tensile, flexural and compressive strength, tensile and flexural modulus, and impact strength.

The mat of the present invention provides numerous advantages in composite forming processes such as GMT, including but not limited to good permeability for impregnation by thermoplastic matrix material, good uniformity of glass distribution and flow into complex mold shapes and provides composites having good surface smoothness and mechanical properties.

It will be appreciated by those skilled in the art that changes could be made to the embodiments described above without departing from the broad inventive concept thereof. It is understood, therefore, that the invention is not limited to the particular embodiments disclosed, but it is intended to cover modifications which are within the spirit and scope of the invention, as defined by the appended claims.

Therefore, we claim:

1. A mat adapted to reinforce a thermoplastic matrix material, the mat comprising:
   (a) a plurality of glass monofilaments present in an amount ranging from at least about 30 weight percent to about 99 weight percent of the mat on a total solids basis, the plurality of glass monofilaments having a mean average length ranging from about 5 to about 150 millimeters and having a filament coating composition which is compatible with a thermoplastic matrix material applied to at least a portion of surfaces of the glass monofilaments; and
   (b) a plurality of glass fiber strands, each glass fiber strand having at least about 100 generally parallel glass fiber monofilaments, the plurality of glass fiber strands having a mean average length ranging from about 5 to about 150 millimeters and having a strand coating composition which is compatible with the thermoplastic matrix material applied to at least a portion of surfaces of the glass fiber strands;
   wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands by needling the portions together.

2. The mat according to claim 1, wherein the filament coating composition is present upon the surfaces of the monofilaments as an essentially dried residue.

3. The mat according to claim 1, wherein the strand coating composition is present upon the surfaces of the glass fiber strands as an essentially dried residue.

4. The mat according to claim 1, wherein the filament coating composition is different from the strand coating composition.

5. The mat according to claim 1, wherein the filament coating composition is the same as the strand coating composition.

6. The mat according to claim 1, wherein the glass monofilaments are present in an amount ranging from about 40 weight percent to about 90 weight percent of the mat on a total solids basis.

7. The mat according to claim 1, wherein the glass monofilaments are present in an amount ranging from about 50 weight percent to about 70 weight percent of the mat on a total solids basis.

8. The mat according to claim 1, wherein the glass fiber strands are present in an amount ranging from about 1 weight percent to about 70 weight percent of the mat on a total solids basis.

9. The mat according to claim 1, wherein the glass monofilaments and the glass fiber strands are needled together at a punch density ranging from about 12 to about 47 punches per square centimeter.

10. The mat according to claim 1, wherein the mat surface weight ranges from about 500 to about 1200 grams per square meter.

11. The mat according to claim 1, wherein the mat further comprises a plurality of randomly oriented essentially continuous glass fibers.

12. The mat according to claim 1, wherein the mat further comprises a plurality of unidirectional essentially continuous glass fibers.

13. The mat according to claim 1, wherein the mat further comprises a fabric.

14. The mat according to claim 1, wherein the fabric comprises glass fiber.

15. The mat according to claim 1, wherein the mat further comprises fibers formed from a material selected from the group consisting of thermoplastic materials, thermosetting materials and natural materials.

16. A reinforced polymeric composite comprising:
   (a) a thermoplastic matrix material; and
   (b) a reinforcing mat comprising:
      (1) a plurality of glass monofilaments present in an amount ranging from at least about 30 weight percent to about 99 weight percent of the mat on a total solids basis, the plurality of glass monofilaments having a mean average length ranging from about 5 to about 150 millimeters and having a filament coating composition which is compatible with the thermoplastic matrix material applied to at least a portion of surfaces of the glass monofilaments; and
      (2) a plurality of glass fiber strands comprising at least about 100 glass fiber monofilaments per strand, the glass fiber strands having a mean average length ranging from about 5 to about 150 millimeters and having a strand coating composition which is compatible with the thermoplastic matrix material applied to at least a portion of surfaces of the glass fiber strands;
   wherein the mat has a mat surface weight greater than about 200 grams per square meter, the glass monofilaments and glass fiber strands are essentially uniformly distributed throughout the mat and at least a portion of the glass monofilaments are entangled with at least a portion of the glass fiber strands by needling the portions together.

17. The composite according to claim 16, wherein the thermoplastic matrix material is selected from the group consisting of polyolefins, polyamides, thermoplastic polyurethanes, thermoplastic polyesters, acrylic polymers, vinyl polymers, derivatives and mixtures thereof.

18. A method for making a mat adapted to reinforce a thermoplastic matrix material, the method comprising the steps of:
   (a) mixing a plurality of glass monofilaments with a plurality of glass fiber strands to form an essentially uniform mixture, the glass monofilaments comprising about 30 to about 99 weight percent of the mixture on a total solids basis, the glass monofilaments having a mean average length ranging from about 5 to about 150 millimeters and having a filament coating composition which is compatible with a thermoplastic matrix material applied to at least a portion of surfaces of the glass monofilaments, each glass fiber strand having at least about 100 generally parallel glass fiber monofilaments, the plurality of glass fiber strands having a mean average length ranging from about 5 to about 150 millimeters and having a strand coating composition which is compatible with the thermoplastic matrix material applied to at least a portion of surfaces of the glass fiber strands;
   (b) dispensing the mixture onto a collector to form a mat having a mat surface weight greater than about 200 grams per square meter; and
   (c) entangling the glass monofilaments with the glass fiber strands of the mat by needling the monofilaments and glass fiber strands together.

19. A method for reinforcing a thermoplastic matrix material to form a reinforced composite, the method comprising the steps of:
   (a) coating an impregnating at least a portion of the mat of claim 18 with a thermoplastic matrix material;
   (b) heating the thermoplastic matrix material; and
   (c) cooling the thermoplastic matrix material to provide a reinforced thermoplastic composite.

* * * * *